March 22, 1960 G. A. STEWART 2,929,603
CORNEAL CLAMP
Filed July 3, 1958
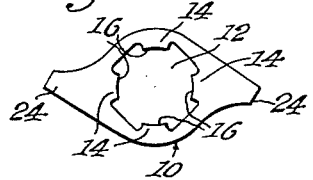
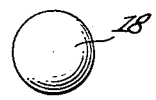
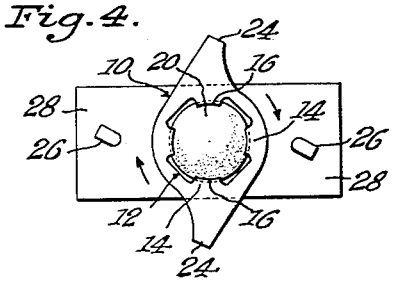
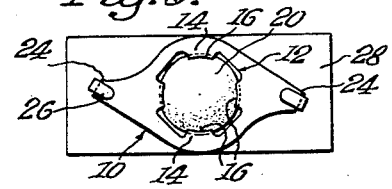
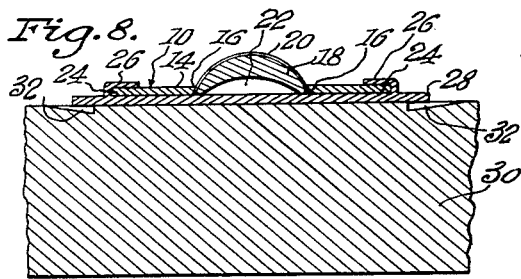
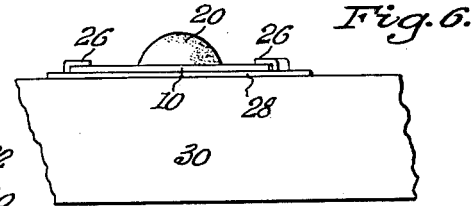
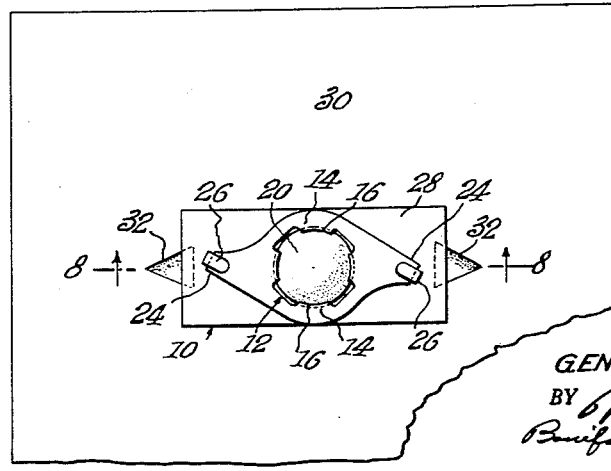
INVENTOR.
GENE A. STEWART
BY
ATTORNEYS

United States Patent Office 2,929,603
Patented Mar. 22, 1960

2,929,603

CORNEAL CLAMP

Gene A. Stewart, Washington, D.C.

Application July 3, 1958, Serial No. 746,569

3 Claims. (Cl. 248—361)

(Granted under Title 35, U.S. Code (1952), sec. 266)

The invention described herein may be manufactured and used by or for the Government for governmental purposes without the payment of any royalty thereon.

The operation of keratoplasty frequently has been limited by the unavailability of donor corneal material, and for obviating such unavailability, many attempts have been made to store corneal grafts over long periods, and various methods for such storage of donor corneal materials have been undertaken but without success. Such attempts have included rapid freezing in liquid nitrogen with and without isopentane as an intermediate heat-transfer medium. See, in this connection, papers by H. M. Katzin: "Preservation of Corneal Tissue by Freezing and Dehydration," Am. J. Ophth. 30: 1128 (1947); I. H. Leopold and F. H. Adler: "Use of Frozen-Dried Cornea as Transplant Material," Arch. Ophth. 37: 268 (1947); G. H. Smelser and V. Ozanics: "Effect of Quick Freezing at Various Temperatures of Donor Tissues in Corneal Transplants," Proc. Soc. Exper. Biol. and Med. 62: 274–277 (1946). In the method described in the first two of the foregoing papers, the grafts, after freezing, were dried in vacuo over phosphorus pentoxide at —40° C. They were reconstituted before use, in most cases, by the addition of isotonic sodium chloride solution. In the paper by Smelser and Ozanics, the materials were not dried, but were stored at —195° C. for periods of from one hour up to five days. The grafts then were rapidly thawed by immersion in isotonic sodium chloride solution at 39° C. When thus prepared for implantation, both the frozen and the freeze-dried grafts were clear and of normal consistency. A great majority of these grafts healed well after implantation, but in most of them translucency was lost within the first three weeks. There was no lasting transparency in any of the grafts during the time that they were observed.

In 1949, Polge and associates found that fowl spermatozoa treated with glycerin-saline solution retained their motility after freezing and thawing (C. Polge, A. U. Smith, and A. S. Parkes: "Revival of Spermatazoa After Vitrification and Dehydration at Low Temperature," Nature, London 164: 666, 1949). Since that time, marked success has been reported on the survival of skin, blood, and endocrine tissue treated in a similar manner (A. U. Smith and A. S. Parkes: "Preservation of Ovarian Tissue at Low Temperature," Lancet 2: 570, 1951). In early 1954, Eastcott and his colleagues reported that human corneas treated in this way and stored at —79° C. yielded lamellar grafts that differed in no way from fresh grafts in their final result and transparency (H. H. G. Eastcott, A. G. Cross, A. G. Leigh, and D. P. North: "Preservation of Corneal Grafts by Freezing," Lancet 1: 237, 1954).

Since success had been obtained in preserving corneas by using the glycerin-saline technique with freezing, there was considered the possibility of carrying the process one step further and drying the tissue in a vacuum. This consisted essentially of drying corneas by removing the water from the glycerin solution (J. N. McNair and J. H. King, Jr.: "Preservation of Cornea by Dehydration," A.M.A. Archives of Ophthalmology 53: 519–521, 1955).

This new system used to preserve donor cornea by dehydration has brought about one of the greatest advances in ophthalmology since the first fresh corneal transplant was effected. Now it is possible to store donor corneas indefinitely and stockpile them for future use. However, it has been observed that when donor corneas which have been preserved in this manner are removed from their storage containers, the cornea have a tendency to wrinkle, and also during the process of dehydration, the donor corneas sometimes roll up or fold with resulting creases such as a piece of paper would have after being folded. Additionally, in view of the opaqueness of the donor corneas, their visibility in the preserving and dehydrating liquid, which usually is substantially anhydrous glycerin, may be reduced to the point where difficulty is experienced in locating the cornea for removal thereof from the preserving and dehydrating liquid. When dehydrated donor corneas which do not roll up or fold are rehydrated, they have smooth surfaces, whereas those that have folded are ridged where the folds have occurred, and the presence of such ridges makes it very difficult to remove a lamellar graft from the cornea and maintain the graft at the same thickness throughout.

The customary present practice is to provide a hemispherical mounting for the cornea, which mounting is composed of a suitable moldable "plastic" material, to which mounting the cornea is secured by pins, the mounting with the cornea thus secured being buried in a body of sterile paraffin contained in a Petri dish, while in the case of dehydrated cornea, the cornea for the transplant is suspended free in the preserving and dehydrating liquid contained in a test tube, and because the cornea is opaque it is difficult to see and to secure. However, in accordance with the instant invention, there is provided a corneal clamp composed of suitable plastic material for use in keratoplasty when trephining the donor or dehydrated cornea, which clamp includes a simple locking device to hold the cornea in a secure position with a table for use of the trephine. The cornea is dehydrated in a test tube and opened in the operating room as needed. A plastic slab which receives the locking device remains in the operating room. If the table for the locking device is marred by cutting action of the trephine, the device can be disposed of, as its cost is negligible.

The present invention therefore provides a simple mechanical clamp construction for receiving and maintaining corneas which are being preserved by a standard dehydration technique free from deformations such as the aforesaid wrinkling and folding during the dehydration, while providing for drainage of moisture from the endothelium side of the cornea during dehydration thereof.

Further objects and advantages of the present construction will become apparent as the description proceeds and the features of novelty will be pointed out in particularity in the appended claims.

The structural details and features of the corneal clamp of the present invention are shown in the accompanying drawings, in which—

Fig. 1 is a plan view of a locking unit employed in the present invention;

Fig. 2 is a plan view of a hemispherical corneal mounting unit employed in conjunction with the locking unit shown in Fig. 1;

Fig. 3 is a vertical section of the mounting device of Fig. 2;

Fig. 4 is a plan view of the complete clamping assembly with the locking device of Fig. 1 and the corneal mounting of Figs. 2 and 3 in position on a mounting plate therefor provided with oppositely disposed locking lugs, the arrows indicating the direction of rotation of the locking element of Fig. 1 for manipulating the same to bring it into secured position on the mounting plate;

Fig. 5 is a plan view of the assembly of Fig. 4, but showing the parts turned with respect to the locking plate so as to be secured thereby;

Fig. 6 is a side elevation of the clamping assembly shown in Fig. 5, with the parts in secured position as illustrated in Fig. 5;

Fig. 7 is a plan view of the assembly shown in Figs. 5 and 6, showing the clamping assembly positioned on an operating table surface; and Fig. 8 is a sectional view taken on the line 8—8 of Fig. 7, looking in the direction of the arrows.

Referring more particularly to the drawings, the cornea clamp construction of the present invention comprises an assembly of separable parts or units including a locking unit 10 having a generally circular center opening 12, the periphery of which is provided with opposite, inwardly projecting tongues 14 having beveled ends 16 which are adapted to receive a substantially hemispherical cornea-mounting 18, the upper surface of which is adapted to receive a cornea 20 that is to be preserved in a manner noted above for graft purposes, the mounting 18 being slipped into the opening 12 of the locking unit 10 until the beveled ends 16 of the opposite locking tongues 14 engage and lockingly interfit with a cornea 20, thereby securing the cornea 20 rigidly on its mounting 18 free from folds or wrinkles or other surface deformations. The flat undersurface of the hemispherical mounting 18 is recessed as is indicated at 22 for a purpose to be noted hereinafter.

The locking unit 10 is provided with oppositely-directed locking fingers 24 adapted to slip under opposite angular upstanding locking lugs 26 provided on a mounting plate or table 28 and to be secured thereby in interlocked relation with the said mounting table 28, which for use is placed on a slab 30 having oppositely disposed beveled recesses 32 in its top surface which are adapted to be overlaid by the ends of the mounting table 28.

In practice, a donor cornea which is to be used subsequently in forming a corneal graft, is applied smoothly to the hemispherical mounting 18, the undersurface 22 of which is recessed to facilitate insertion of a lifting tool for the mounting 18, and the locking unit 10 is applied over the hemispherical mounting which enters the center opening 12, the unit 10 being then pressed downwardly until opposite beveled ends 16 of the locking tongues or projections 14 tightly engage the cornea 20 which thereby is maintained firmly on the mounting 18 and free from irregularities, wrinkles, folds, creases, or any other surface deformations. The assembled cornea-carrying hemispherical mounting 18 and the locking unit 10 are applied to the mounting table 28 and turned with respect thereto until locking fingers 24 engage under the oppositely-directed locking lugs 26 provided on the mounting table or plate 28 for the purpose of securing the cornea-carrying hemispherical mounting 18 and the locking unit 10 in place on the mounting table 28. The resulting interlocked assembly now is ready for insertion into a vessel such as a test tube, containing anhydrous glycerine for effecting dehydration and preservation of the cornea 20 until the latter is to be used.

The character of the assembly enables ready retrieving thereof from the preserving and dehydrating liquid, the cornea 20 being maintained continuously completely free from surface deformations and irregularities of all kinds, and it is recovered ready for trephining into a lamellar graft. For recovery, the assembly is placed on a slab 30 with the ends of the mounting table 28 overlying the beveled recesses 32 in the top surface of the slab 30, thereby enabling the locking unit 10 to be rotated until the locking fingers 24 thereof clear the angular locking lugs 26 on the mounting table 28, so that the locking unit 10 and hemispherical mounting 18 may be lifted from the mounting table 28. The recessed under surface 22 of the mounting 18 facilitates such separation by enabling a lifting implement to be inserted more readily under the mounting 18 than would be the case if the under surface of the mounting were planar in character. The mounting 18 carrying the prepared cornea 20 and the locking unit 10 thus may be removed from the mounting table 28, and the mounting 18 with its prepared cornea thereon may be separated from the locking unit 10 by exercising separating pressure thereon, and the cornea 20 may be removed from its mounting 18 in undistorted and non-deformed condition. The mounting table 28 may be released readily from the slab 30 by insertion of a lifting instrument, such as forceps or the like, into the recesses 32 and thereby lift the mounting table 28 from the slab 30 by breaking the adhesion therebetween. In practice, the entire assembly may be composed of a suitable molded "plastic" material of many different available compositions, such as "Vinylite," "Lucite," or the like, which material is inert to the cornea and to the preserving and dehydrating liquid. Many suitable synthetic plastic materials are available at trivial costs.

I claim:

1. A clamp for maintaining eye cornea in condition suitable for keratoplasty, comprising, in combination, a substantially hemispherical cornea-mounting element for receiving cornea free from surface irregularities and distortions, a removable locking element including a central opening adapted to receive the cornea-mounting element and including oppositely disposed locking projections directed inwardly with respect to the central opening and adapted to exert locking pressure on the cornea-mounting element and on a cornea mounted on the element for maintaining the cornea smoothly distributed over the mounting element, oppositely directed locking fingers on the locking element, a mounting table beneath the locking element, and means on the mounting table cooperating with the locking fingers for securing the hemispherical cornea-mounting element and the locking element in interlocked relation with respect to each other and to the mounting table.

2. A clamp for maintaining eye cornea in condition suitable for keratoplasty, comprising, in combination, a substantially hemispherical cornea-mounting element for receiving cornea free from surface irregularities and distortions and having a recessed under-surface, a removable locking unit including an opening adapted to receive the cornea-mounting element and including oppositely disposed locking tongues directed inwardly with respect to the central opening and terminating in beveled locking surfaces adapted to exert locking pressure on the cornea-mounting element and on a cornea mounted on the element for maintaining the cornea smoothly distributed over the mounting element, oppositely-directed locking fingers on the locking unit, a mounting table beneath the cornea-mounting unit and the locking unit, and oppositely directed angular upstanding flanged locking lugs on the mounting table cooperating with the locking fingers for securing the hemispherical cornea-mounting unit and the locking unit in interlocked relation with respect to each other and to the mounting table, the said locking lugs being frictionally engageable by the locking fingers on the locking unit responsively to rotation of the locking unit until the locking fingers thereof engage the locking lugs intermediate the upstanding angular flanges thereof and the mounting table.

3. The clamp structure as claimed in claim 2, in combination with a supporting slab therefor having an upper surface provided with oppositely disposed beveled recesses adapted to be partially overlaid by opposite end edges of the mounting table of the clamp structure, the said recesses facilitating separation of the clamp structure from the slab by enabling introduction of lifting means beneath the mounting table of the clamp structure for breaking adhesion between the mounting table and slab, the beveled recesses being similarly contoured in outwardly diminishing depth, and disposed with deepest portions in direct opposition toward each other and similarly sloping upwardly to the upper surface of the slab, the beveled recesses being alignedly spaced apart at a distance conforming to the length of the mounting table of the clamping structure and being partially covered by opposite ends of the mounting table, the outwardly diminishing depth of the recesses defining guides for facilitating insertion of a separating tool beneath the mounting table for effecting separation of the mounting table from the upper surface of the slab without disturbing relative positions of parts of the clamp.

References Cited in the file of this patent

UNITED STATES PATENTS 378,449     Kendall _____ Feb. 28, 1888